United States Patent
Hemminger et al.

(10) Patent No.: US 6,470,083 B1
(45) Date of Patent: Oct. 22, 2002

(54) TELECOMMUNICATIONS OFF-HOOK AND INTRUSION DETECTION METHOD AND APPARATUS

(75) Inventors: Rodney C. Hemminger; Albert H. Maxwell, Jr.; Michael A. Murphy, all of Raleigh, NC (US); Thomas J. Van Heuklon, Kaukauna; Richard L. Tenor, Green Bay; Todd P. Kelsey, Appleton, all of WI (US); Fred F. Schleifer, Roseville, MN (US)

(73) Assignee: ABB Automation Inc., Wickliffe, OH (US)

( * ) Notice: Subject to any disclaimer, the term of this patent is extended or adjusted under 35 U.S.C. 154(b) by 0 days.

(21) Appl. No.: 08/998,166

(22) Filed: Dec. 24, 1997

(51) Int. Cl.[7] ................................................ H04M 1/00
(52) U.S. Cl. .............. 379/387.02; 379/377; 379/106.08
(58) Field of Search ........................ 379/387.01, 387.02, 379/399.01, 381, 377, 106.08, 106.03, 93.09, 93.11

(56) References Cited

U.S. PATENT DOCUMENTS

| | | | | |
|---|---|---|---|---|
| 4,022,989 A | | 5/1977 | Hoppough | 179/175.2 C |
| 4,187,460 A | * | 2/1980 | Dauge et al. | 324/60 |
| 4,221,935 A | | 9/1980 | Barsellotti et al. | 179/17 E |
| 4,230,914 A | | 10/1980 | Korwin et al. | 179/81 E |
| 4,232,195 A | | 11/1980 | Bartelink | 179/2 A |
| 4,590,444 A | * | 5/1986 | Wilcox | 331/111 |
| 4,777,645 A | * | 10/1988 | Faith et al. | 379/31 |
| 4,791,658 A | | 12/1988 | Simon et al. | 379/41 |
| 4,811,389 A | | 3/1989 | Balch | 379/377 |
| 5,010,568 A | | 4/1991 | Merriam et al. | 379/107 |
| 5,134,650 A | | 7/1992 | Blackmon | 379/107 |
| 5,161,182 A | | 11/1992 | Merriam et al. | 379/107 |
| 5,381,462 A | | 1/1995 | Larson et al. | 379/107 |
| 5,537,029 A | | 7/1996 | Hemminger et al. | 324/142 |
| 5,544,089 A | | 8/1996 | Hemminger et al. | 364/492 |
| 5,548,527 A | | 8/1996 | Hemminger et al. | 364/492 |
| 5,555,508 A | | 9/1996 | Munday et al. | 364/492 |
| 5,621,629 A | | 4/1997 | Hemminger et al. | 363/56 |
| 5,631,843 A | | 5/1997 | Munday et al. | 364/492 |
| 5,929,663 A | * | 7/1999 | Dougherty | 327/101 |

* cited by examiner

Primary Examiner—Stella Woo
(74) Attorney, Agent, or Firm—Woodcock Washburn LLP

(57) ABSTRACT

A method and apparatus to detect off-hook and intrusion conditions on a telephone line. A voltage to frequency converter is used to convert the voltage measured between the TIP and RING terminals of a telephone line to a frequency. The voltage is continuously monitored, once during each sample period. The measured frequency is compared to predetermined threshold values to determine the state of the telephone line. The predetermined threshold values are updated in each sample period.

67 Claims, 8 Drawing Sheets

TELECOMMUNICATIONS OFF-HOOK AND INTRUSION DETECTION METHOD AND APPARATUS

FIELD OF THE INVENTION

The present invention relates in general to the field of utility meters. More particularly, the present invention relates to automatic equipment and systems used for remote reading of utility meters, such as electric, gas, or water meters, via telephone lines. Even more particularly, the present invention relates to a method and apparatus for detecting off-hook and intrusion conditions on a telephone line.

BACKGROUND OF THE INVENTION

Utility companies use utility usage meters to determine the utility consumption at a customer site. A periodic reading of the utility meter is necessary to determine the usage and to bill the customer for the amount used. The need to send utility company employees to customer sites to read the meters is costly, time consuming, and subject to considerable error. Thus, automated means of recording and reporting the utility usage at customer sites is rapidly replacing the manually read utility meters.

Many companies provide automatic meter reading equipment which is capable of reading meters on customer premises and transmitting the meter readings automatically to a central office of the utility company. Typical systems use both telephone and radio schemes for transmitting the meter readings to the central office.

In the past, there has been on-site meter reading equipment having modem capability which was capable of receiving telephone calls from a central office through the use of special equipment located at the telephone company, and there have also been on-site meters with modems which were capable of transmitting telephone calls to the central office. In general, these systems incorporate an auto-dial, auto-answer modem in each customer site to receive interrogation signals from the telephone line and to formulate and transmit meter readings via the telephone line to the utility company. Prior art systems record information on utility usage and periodically dial into a central office to report the utility usage for recording and billing purposes. These systems are used for reporting electric, gas, and water usage, and the like.

Some prior art systems connect to a customer's existing telephone line to communicate with the central office by sending information over the telephone lines. The modem shares the telephone line with the customer's normal usage, such as incoming and outgoing voice communications. Such sharing requires that the system be able to recognize when the telephone line is in use, and to delay demanding use of the telephone line until it is free. Steps must be taken to prevent the data communications system from interfering with other uses and to prevent other uses from corrupting the transmitted data.

The prior art systems have several fundamental shortcomings. For example, when the modem of the utility meter is communicating online with the central office, the customer cannot use the telephone line for dialing out. This is a serious shortcoming if the need arises to dial an emergency number such as 911. Moreover, prior art systems that detect customer's usage of a telephone line have active circuitry near the telephone terminals (the TIP and RING terminals) to measure the voltage on a telephone line. This active circuitry requires isolated power. This results in complex and costly systems.

It should also be noted that many prior art systems use dedicated lines and do not share a telephone line with the customer's normal usage. These systems are complex and costly.

Although the art of meter reading via modems and telephone lines is well developed, there remain some problems inherent in this technology, particularly with respect to detecting consumer usage of the telephone line. Therefore, a need exists for a low cost, less complex method and apparatus to detect customer usage of the telephone, such as off-hook and intrusion conditions, so that the customer's use of the telephone is not affected.

SUMMARY OF THE INVENTION

The present invention is directed to an apparatus for determining the state of a telephone line, comprising: voltage to frequency measurement means for measuring a voltage between a TIP terminal and a RING terminal on the telephone line and converting the voltage to a frequency; and comparator means for comparing the frequency with a first value to determine the state of the telephone line.

In the present invention, the voltage to frequency measurement means comprises a voltage to frequency converter and the comparator means comprises a microcontroller, the microcontroller coupled to the voltage to frequency converter to receive the frequency from the voltage to frequency converter. The voltage to frequency converter comprises a RC relaxation oscillator having a tuning element and an active element. The tuning element is a diode and the active element is a comparator.

Furthermore, in accordance with an aspect of the present invention, a TIP/RING filter coupled between the TIP and RING terminals and the voltage to frequency measurement means; and a voltage isolator coupled between the tuning element and the active element. The voltage isolator comprises two coupling capacitors connected in series with the tuning element.

Another aspect of the present invention is directed to means for connecting a modem to the telephone line when the frequency is not less than the first value. Means for disconnecting the modem from the telephone line when the frequency becomes less than a second value are also provided.

In the present invention, means for preventing a telecommunications device from connecting on the telephone line when the frequency is less than the first value are also provided.

In the present invention, the first value is determined responsive to the voltage between the TIP terminal and the RING terminal.

In a further embodiment within the scope of the present invention, an apparatus is provided for determining an intrusion state of a telephone line having a telecommunications device connected thereon, comprising: voltage to frequency measurement means for measuring a voltage between a TIP terminal and a RING terminal on the telephone line and converting the voltage to a frequency; and comparator means for comparing the frequency with a threshold value to determine the intrusion state of the telephone line. Means for disconnecting the telecommunications device from the telephone line when the frequency is less than the threshold value are also provided.

In a further embodiment within the scope of the present invention, an apparatus is provided for determining the state of a telephone line, comprising: measurement means comprising a tuning diode for measuring a voltage between a TIP terminal and a RING terminal on the telephone line; and comparator means for comparing a value responsive to the voltage with a first value to determine the state of the telephone line.

In a further embodiment within the scope of the present invention, an apparatus is provided for determining the state of a telephone line, comprising: measurement means comprising capacitive isolation for measuring a voltage between a TIP terminal and a RING terminal on the telephone line; and comparator means for comparing a value responsive to the voltage with a first value to determine the state of the telephone line.

Another embodiment within the scope of this invention includes an apparatus for detecting an off-hook condition and an intrusion condition on a telephone line, comprising: a voltage to frequency converter for measuring a voltage on the telephone line and converting the voltage to a frequency; and a microcontroller coupled to the voltage to frequency converter for receiving the frequency and determining whether at least one of an off-hook and intrusion condition exists on the telephone line responsive to the frequency. The voltage is a TIP to RING voltage.

In accordance with one aspect of the present invention, a common mode filter is coupled between the telephone line and the voltage to frequency converter, and a voltage isolator coupled between the tuning diode and the comparator.

In accordance with another aspect of the present invention, means are provided to connect a modem to the telephone line when no off-hook condition is detected. Means are also provided to disconnect the modem from the telephone line when an intrusion condition is detected.

In the present invention, the voltage to frequency converter measures the voltage at a predetermined sampling rate. According to one aspect of the present invention, the predetermined sampling rate is one measurement every $1/16$ seconds.

In the present invention, the off-hook condition is detected when the frequency drops below a first threshold and the intrusion condition is detected when the frequency drops below a second threshold.

In accordance with one aspect of the present invention, memory is provided to store frequency and voltage data used by the microcontroller in the detection of the off-hook and the intrusion conditions.

In a further embodiment within the scope of the present invention, an apparatus is provided for determining the state of a telephone line having an isolation barrier separating the telephone line into a side near a TIP terminal and a RING terminal, and a side away from the TIP terminal and the RING terminal, comprising: measurement means for measuring a voltage between the TIP terminal and the RING terminal on the telephone line, the measurement means being free of a power supply on the side near the TIP terminal and the RING terminal; and comparator means for comparing a value responsive to the voltage with a first value to determine the state of the telephone line.

Another embodiment within the scope of this invention includes an apparatus for determining the state of a signal-carrying line having an isolation barrier separating the signal-carrying line into a side near a first and a second terminal, and a side away from the first and second terminals, comprising: measurement means for measuring a voltage between the first and second terminals, the measurement means being free of a power supply on the side near the first and second terminals; and comparator means for comparing a value responsive to the voltage with a first value to determine the state of the signal-carrying line.

Another embodiment within the scope of this invention includes a method for detecting the state of a telephone line, comprising the steps of: measuring a voltage between a TIP terminal and a RING terminal on the telephone line; and comparing a value responsive to the voltage with a first value to determine the state of According to one aspect of the present invention, the value is a frequency and the method further comprises the step of converting the voltage to the frequency using a voltage to frequency converter.

According to another aspect of the present invention, the method further comprises connecting a modem to the telephone line when the frequency is not less than the first value; and disconnecting the modem from the telephone line when the frequency becomes less than a second value.

The voltage is measured at a predetermined sampling rate. According to one aspect of the present invention, the predetermined sampling rate is one measurement every $1/16$ seconds.

According to other aspects of the present invention, the method further comprises the step of setting the first value responsive to the voltage between the TIP terminal and the RING terminal.

Another embodiment within the scope of this invention includes a method for detecting the state of a telephone line, comprising the steps of: measuring a voltage between a TIP terminal and a RING terminal on the telephone line; comparing a value responsive to the voltage with one of a first threshold value and a second threshold value to determine the state of the telephone line; connecting a telecommunications device to the telephone line when the value is not less than the first threshold value; disconnecting the telecommunications device from the telephone line when the value becomes less than the second threshold value; and determining the first threshold value and the second threshold value based on the state of the telephone line and the voltage between the TIP terminal and the RING terminal.

According to one embodiment of the present invention, the method further comprises the steps of measuring a voltage between a TIP terminal and a RING terminal on the telephone line and converting the voltage to a frequency; and comparing the frequency with a threshold value to determine the intrusion state of the telephone line.

Another embodiment within the scope of this invention includes a method for determining an intrusion state of a telephone line having a telecommunications device connected thereon, comprising the steps of: measuring a voltage between a TIP terminal and a RING terminal on the telephone line and converting the voltage to a frequency; and comparing the frequency with a threshold value to determine the intrusion state of the telephone line.

The foregoing and other aspects of the present invention will become apparent from the following detailed description of the invention when considered in conjunction with the accompanying drawing.

DESCRIPTION OF EXEMPLARY EMBODIMENTS AND BEST MODE

The present invention is directed to a system for providing utility usage information to a central office using a modem coupled to a utility meter at a customer's residence or business site. The system shares usage of the telephone line with the customer, and detects off-hook and intrusion conditions so as not to interfere with the customer's use of the telephone line.

In accordance with the present invention, to detect off-hook and intrusion conditions, a voltage to frequency converter that incorporates a high voltage isolation barrier is monitored to non-intrusively determine the state of a telephone local loop. The present invention adapts to the changing conditions in the telephone local loop and compensates for any non-linearities in the voltage to frequency conversion of the voltage to frequency converter (hereinafter also referred to as a voltage controlled oscillator or VCO). A microcontroller determines if another phone is using the line prior to attempting to place a modem call. In addition, once a modem call is in progress, the present invention determines if another line is intruding, i.e., another line has gone off-hook. The present invention adaptively or dynamically compensates for changes in the local loop to avoid false triggering.

Figure 1:
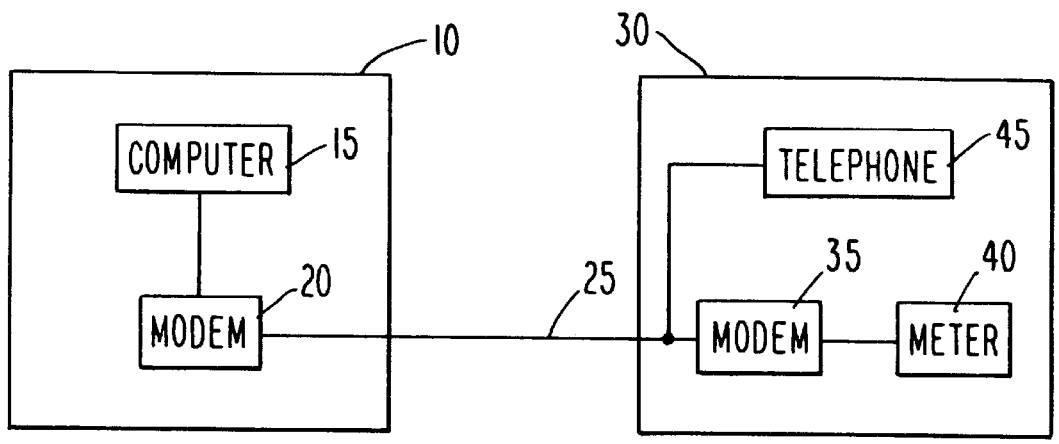
FIG. 1 is a block diagram of an automatic metering system incorporating a meter and modem in accordance with the present invention.

FIG. 1 shows a block diagram of an automatic metering system incorporating a meter unit in accordance with the present invention. A utility company 10 has a computer 15 coupled to a modem 20 in a central office. The modem 20 is coupled to a modem 35 located at a utility customer's site 30, which may be, for example, a business, residential or manufacturing establishment, via a telephone line 25. The modem 35 is coupled to a utility meter 40 which measures the consumption of a utility by utility-consuming equipment (not shown). The modem can be located internal or external to the meter. Data relating to the consumption of the utility is stored in a memory, such as an EEPROM (electrically erasable programmable read-only memory) (not shown) or a random access memory (RAM) which can have a battery back-up, residing within the meter 40. The data is communicated between the memory and the central office of the utility company 10 on the telephone line 25 using the modems 20 and 35. A customer's telephone 45 (or other telephone device or data equipment such as a fax or other modem) is also attached to the telephone line 25.

The meter can be any conventional utility measuring meter. The modem is a conventional modem except that it includes an off-hook and intrusion detector in accordance with the present invention. An off-hook and intrusion detector in accordance with the present invention is preferably coupled to the modem 35 at the customer's site 30. Modem support can be provided on the circuit board of the meter. A modem board is used as a telecommunications interface to report data and alarms. The meter 40 can be programmed to call back to a specified phone number for a billing read and to a second number when an alarm condition occurs.

In accordance with the present invention, communication of utility consumption data can be transmitted from the customer's meter 40 and modem 35 to the utility's central office using any of the conventional techniques. These conventional techniques include (1) having an operator or a computer in the utility's central office initially dial the customer's telephone number, i.e., the telephone number to which the meter modem is connected, to make contact with the meter modem, and (2) having the meter modem dial into the central office at a predetermined time.

Figure 2:
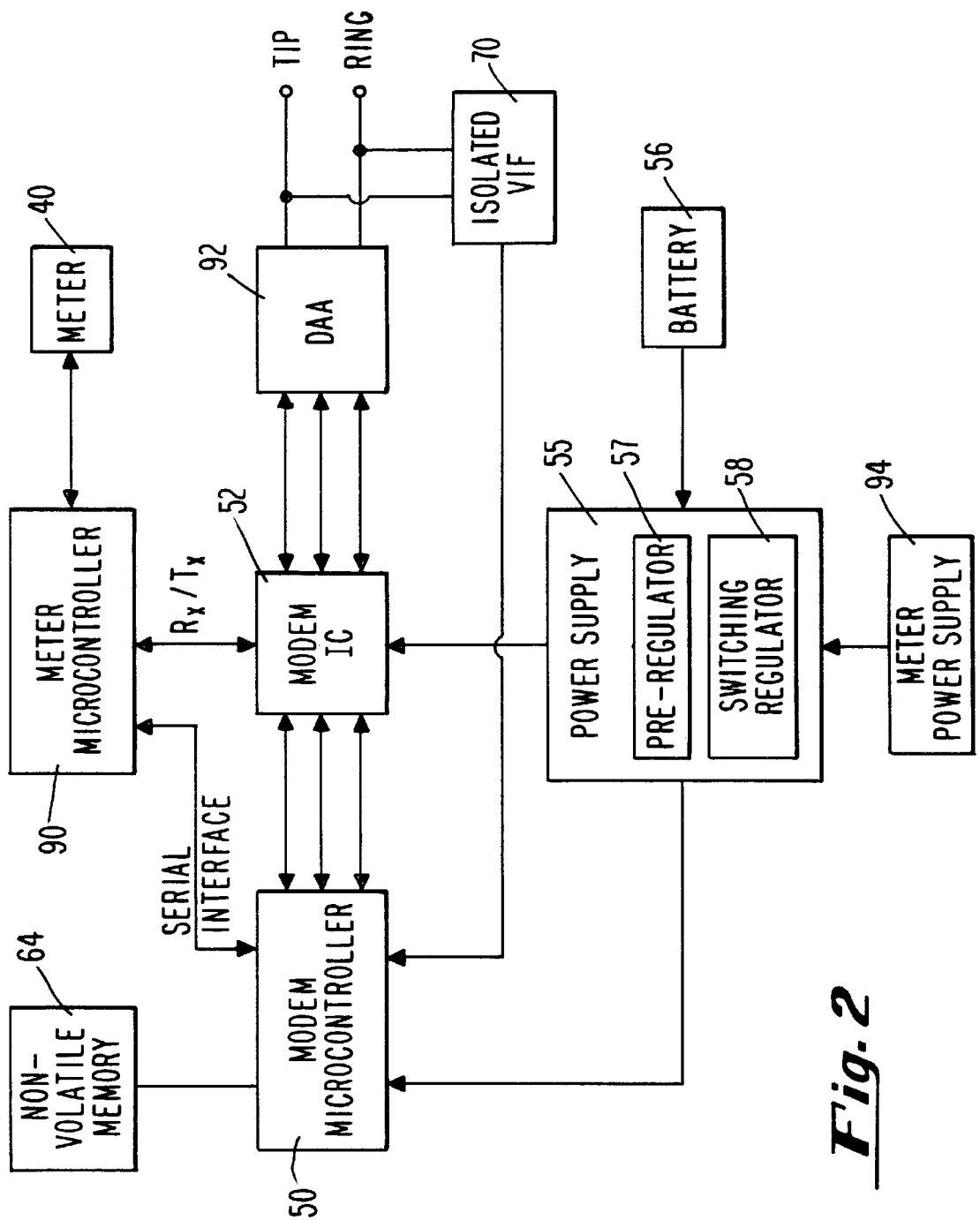
FIG. 2 is a block diagram of an exemplary modem including an off-hook/intrusion detector in accordance with the present invention.

An exemplary block diagram of the modem 35 of FIG. 1 in accordance with the present invention is shown in FIG. 2. The modem comprises a microcontroller 50, a modem integrated circuit (IC) 52, and a power supply 55. The power supply 55 can be a conventional modem power supply comprising, for example, a linear pre-regulator 57 and/or a switching regulator 58, both of with which those skilled in the art are completely familiar, or a modem power supply such as that found in the PowerPlus Alpha® Meter Modem manufactured by ABB Power T&D Company Inc., Raleigh, N.C. Associated switches and discrete devices are not shown but are also within the knowledge of those skilled in the art. The power supply 55 is coupled to the meter power supply 94 from which it receives its power. A battery or battery pack 56 is also coupled to the modem power supply 55 to provide power to the modem in the event of a meter power outage.

The modem is typically supplied from an unregulated 12 V output from the meter. In some meters, the 12 V output is provided from a switching regulator, while in other meters, the output is the rectified output of a linear step-down transformer. When line power to the meter is lost, the modem can switch over to backup power from the battery pack 56 for the purpose of making a phone call to notify the utility company of the power outage. The battery pack 56 can be located within the meter housing. The battery pack 56 preferably consists of series connected lithium thionyl chloride cells.

The modem microcontroller 50 monitors the battery voltage and warns of battery failure. The utility company can be notified about battery status with data sent back via the telephone line. The modem microcontroller 50 controls the direction of serial data between itself, the modem IC 52, and the main meter microcontroller 90. Under normal operating conditions (with the meter 40 powered), the modem microcontroller 50 operates to connect the modem IC 52 to the meter microcontroller 90. In this state, the modem microcontroller 50 monitors the communication between the meter microcontroller 90 and the modem IC 52. When the modem microcontroller 50 detects a power failure, it disconnects the meter 40 from the modem IC 52 and instead connects the modem microcontroller 50 to the modem IC 52. A preferred microcontroller 50 is a PIC17C73 microcontroller manufactured by Microchip.

Figure 4:
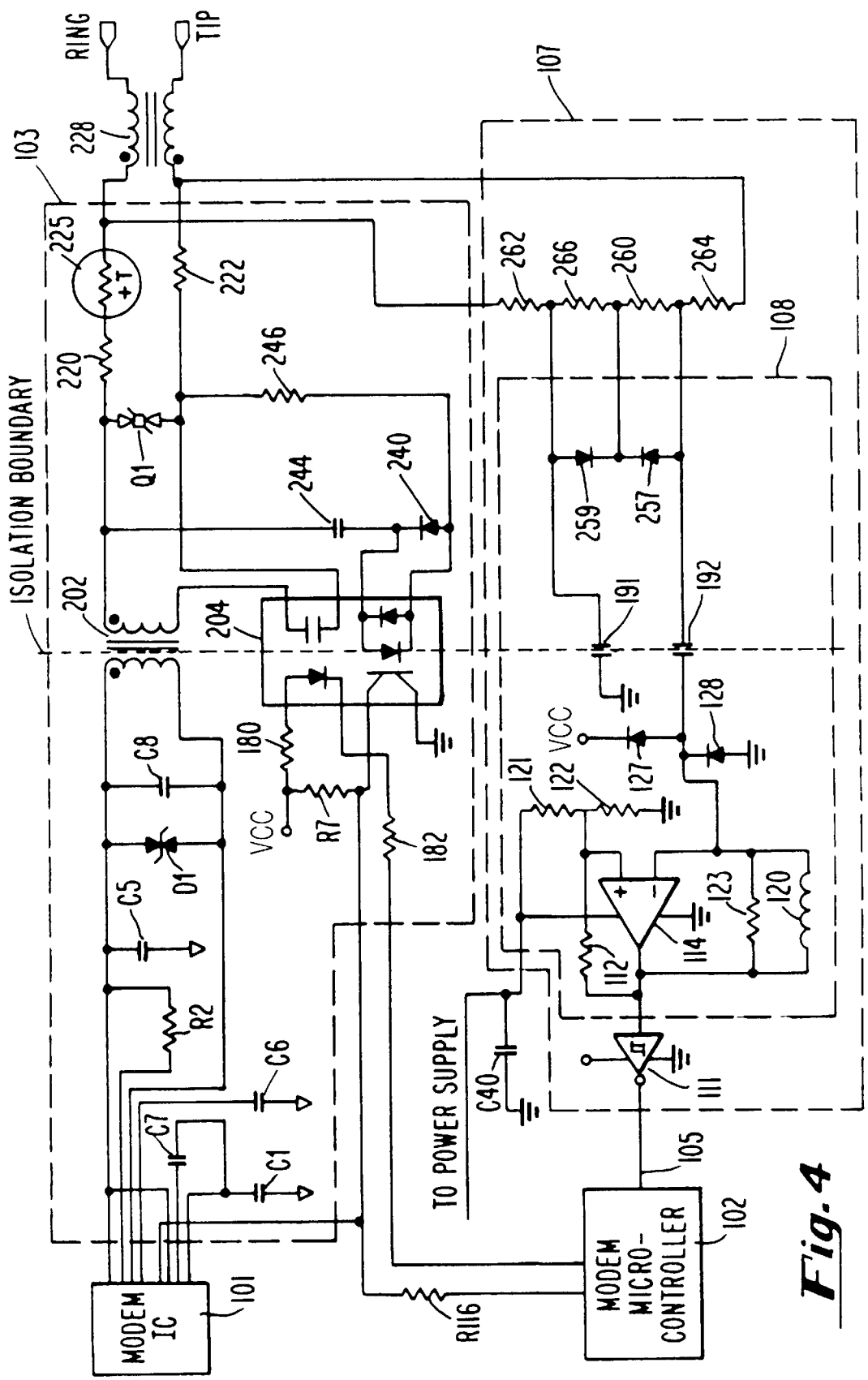
FIG. 4 is a circuit diagram of an exemplary off-hook/intrusion detector in accordance with the present invention.

As is understood by those skilled in the art, the modem microcontroller 50 has direct control of an off-hook relay (element 204 in FIG. 4). This enables the microcontroller 50 to quickly release the telephone line in the event of an intrusion.

A memory 64, preferably non-volatile, is coupled to the modem microcontroller 50, and stores voltage and frequency threshold data used in the determination of off-hook and intrusion conditions, as well as other types of data. The meter microcontroller 90 transmits/receives data to/from the modem IC 52.

The exemplary modem further comprises a data access arrangement (DAA) 92 which is a conventional analog front end portion of a modem and is understood by those skilled in the art. The DAA 92 is connected to the TIP and RING terminals of the telephone line.

The off-hook and intrusion detector is shown in FIG. 2 as an isolated voltage to frequency converter 70. The voltage to frequency converter is connected to the TIP and RING terminals of the telephone line and converts the voltage across the terminals to a frequency which is then compared with certain thresholds or differences to determine the status of the telephone line.

As is understood by those skilled in the art, off-hook is the state of a telephone or data communications device during a call and while initiating a call; i.e., when the telephone or data communications device connects to a telephone line. Intrusion is defined as a second parallel connected telecommunications device going off-hook while a first device is already off-hook. Off-hook status and intrusion detection are accomplished in the present invention by monitoring the voltage between the TIP and RING terminals on the telephone line.

The present invention is used to determine whether the telephone line is available, i.e., on-hook, for use by the modem to communicate the utility consumption data and also to determine whether the customer has picked up a telephone or other telecommunications device while the meter modem is using the telephone line to transmit the data to the central office. If an off-hook state is detected, the meter will not attempt to use the telephone line. If an off-hook state is not detected, the meter will use the telephone line, and the intrusion detector of the present invention will continue to monitor the telephone line for is another telecommunications device to go off-hook (i.e., an intrusion). As soon as an intrusion is detected, the detector of the present invention releases the telephone line, so that the customer can use the telephone line.

When no devices on the line are off-hook, the voltage across the TIP and RING terminals is equal to the central office battery voltage, which in nominal conditions varies from about 42 V to about 56 V. Although these are nominal values, the actual values which may be encountered can be much greater or less than the nominal values due to factors such as telephone line loop resistance. While the present invention was designed to operate on voltages significantly greater than or less than the nominal values set forth above, the following explanation will assume that the nominal values are present.

When the meter modem, or any other parallel connected telecommunications device such as the customer's telephone, is off-hook, the voltage between TIP and RING becomes significantly lower because of the voltage or IR drop of the telephone line. When off-hook, a telecommunications device typically draws at least 20 mA. Because the telephone line loop resistance typically varies from about 400Ω to 1700Ω, the TIP to RING voltage decreases by at least 8.0 V (although this value can vary greatly) when a device goes off-hook (assuming no other parallel connected devices are already off-hook). Although it is not possible under all combinations of central office battery voltage and loop resistance to determine with absolute certainty the off-hook status of other devices using a fixed voltage threshold, it is possible to determine off-hook status by dynamically adjusting the threshold in accordance with the present invention.

If one device is off-hook and then another device goes off-hook (e.g., the meter modem is in use, and then the customer picks up the telephone), an intrusion occurs, and the nominal value between the TIP and RING terminal further drops. Intrusion detection can be accomplished by monitoring changes (differences) in the voltage of the telephone line during a modem call. If, for example, the modem is in the middle of a call, it will provide about a 380Ω load between the TIP and RING terminals. Assuming the nominal 48 V central office voltage and 1100Ω loop resistance, the loop current will be about 30 mA and the voltage between TIP and RING at the modem will be about 11.6 V. If a second parallel connected device also goes off hook, the loop current increases to about 39 mA, assuming the load of the second device is 180Ω. The voltage between TIP and RING is then decreased to about 4.8 V, as compared to the 11.6 V before the intrusion occurred. Even under worst case conditions, with a 1700Ω loop resistance and 42 V central office battery voltage, the loop current will be about 20 mA when only the modem is off-hook. The TIP to RING voltage would then be about 7.7 V. If a second device goes off-hook, the loop current will increase to about 23 mA, so the TIP to RING voltage will decrease to about 2.8 V. Therefore, by monitoring the TIP to RING voltage during a call, the modem can detect an intrusion based on the voltage levels or changes (or frequency changes corresponding to the voltage changes) and release the line for use by the parallel connected device.

Figure 3:
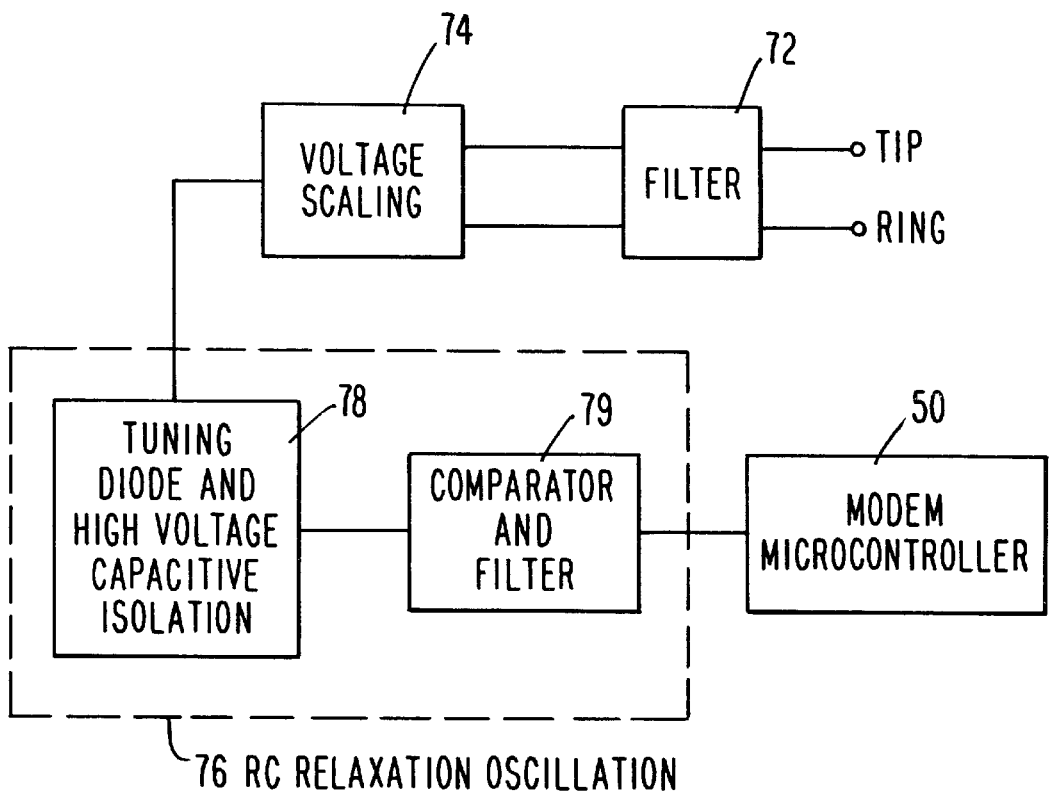
FIG. 3 is a block diagram of the isolated voltage to frequency converter of FIG. 2.

FIG. 3 shows a block diagram of the isolated voltage to frequency converter 70 of FIG. 2. A filter 72, preferably a common mode filter, is disposed at the front end of the converter 70 and is connected to the TIP and RING terminals. Voltage scaling 74 is coupled to the filter 72 to receive the voltage and is provided to scale the voltage to a desired level, and typically consists of a series of resistors. The scaled voltage is provided to an RC relaxation oscillator 76, which comprises a tuning diode and high voltage capacitive isolation section 78 and a comparator and filter section 79. The tuning diode changes the changing voltage into changing capacitance. The output of the oscillator 76 is provided to the modem microcontroller 50 where it is analyzed to determine the status of the telephone line. The modem microcontroller 50 measures the changing frequency as a function of the TIP to RING voltage on the telephone line.

FIG. 4 shows the schematic for a preferred embodiment of an exemplary modem off-hook/intrusion detector in accordance with the present invention along with a conventional DAA. The DAA 103 will be understood by those skilled in the art. The off-hook and intrusion detection circuit (comprising a voltage to frequency converter 107) is preferably low cost, low power, small size, and provides high voltage isolation. The detector circuit is desirably isolated from the telephone line by 1500 V or more to meet FCC part 68 requirements. Moreover, the detector preferably provides 3750 VAC/5300 VDC isolation. Low power is desirable to maximize battery life, and to meet FCC requirements for minimum load on the telephone line, and small size is desirable because of the very limited space within a meter enclosure.

The telephone line TIP to RING voltage is monitored using a voltage to frequency converter 107. The voltage to frequency converter 107 comprises elements 111, 112, 114, 120–123, 127, 128, 191, 192, 257, 259, 260, 262, 264, and 266. The TIP to RING voltage passes through a common mode filter 228 and is then provided to the voltage to frequency converter 107. The output of the voltage to frequency converter 107 is provided to a timer/counter input 105 of a modem microcontroller 102. The microcontroller 102 determines the TIP to RING voltage by measuring the frequency output by the voltage to frequency converter 107. Off-hook status and intrusion detection is then determined responsive to changes in frequency and how the frequency values compare to predetermined thresholds.

As is described below in further detail, the frequency that is output from the voltage to frequency converter is monitored by the modem microcontroller 102. When an on-hook condition is detected, the modem microcontroller attaches a hook relay and places the modem call to the central office. When an intrusion condition is detected, the modem microcontroller releases the hook relay so that the customer can use the telephone line.

A common mode TIP/RING filter 228, which in the preferred embodiment is manufactured by Coilcraft and has an inductance of approximately 35 mH, provides a typical attenuation of about 15 to 20 dB from about 3 MHZ to 500 MHZ. The TIP/RING filter 228 is used to minimize radiated emissions.

Voltage to frequency conversion is performed using a voltage controlled RC relaxation oscillator 108. The oscillator 108 is a part of the voltage to frequency converter 107 and comprises elements 112, 114, 120–123, 127, 128, 191, 192, 257, and 259. The tuning element of the oscillator 108 is a very high capacitance ratio tuning diode (diode 257 or diode 259), such as a Motorola MVAM125. The tuning diode 257 (259) is biased by a fraction of the TIP to RING voltage. As the voltage between TIP and RING changes, the bias voltage to the tuning diode 257 (259) also changes. This, in turn, changes the capacitance of the tuning diode 257 (259) which changes the frequency of the oscillator. The output frequency is roughly proportional to the TIP to RING voltage. In this way, changes in TIP to RING voltage can be observed by monitoring changes in the output frequency of the oscillator. In other words, the apparatus determines the frequency change in the oscillator output, and then, based on the frequency change, determines the change in TIP to RING voltage, which determines whether an off-hook or intrusion condition has occurred.

High voltage isolation is provided between the tuning element 257 (259) and the active portion of the oscillator through two high voltage coupling capacitors 191 and 192. The coupling capacitors 191 and 192 are each preferably rated at at least about 1500 V, and more preferably rated between about 1500V and 20,000V and most preferably rated at about 5000 V. The isolation achievable is limited only by the voltage rating of the coupling capacitors 191 and 192. The coupling capacitors 191 and 192 are connected in series with the tuning element 257 (259) and have sufficiently high capacitance so that their contribution to the equivalent series capacitance is small compared to that of the tuning element 257 (259) when its capacitance is maximum. Thus, in other words, the voltage to frequency converter uses two coupling capacitors 191 and 192 in series with the tuning element to bridge a high voltage isolation barrier. The present invention, therefore, allows a DC voltage to be measured across an isolation barrier without any need to generate an isolated supply voltage at the point of measurement. Thus, additional power is not needed to measure the voltage on a telephone line.

The active portion of the oscillator uses a very low power rail-to-rail output comparator 114. In the embodiment shown in FIG. 4, the comparator 114 preferably is a MAX987EUK-T manufactured by Maxim and requires only about 96 $\mu$A maximum. Actual current used by the entire circuit shown in FIG. 4 is approximately 35 mA when active.

The modem off-hook and intrusion detection circuit of the present invention operates with TIP to RING voltages of either polarity. If TIP is positive with respect to RING, then diode 257 is forward biased while diode 259 is reverse biased. In this case, diode 257 and resistor 260 can be thought of as a voltage source, e.g., a −0.7 V voltage source in this example. Because diode 259 will be reverse biased, its capacitance depends on the reverse bias voltage; diode 259 is the tuning element in this case. If, on the other hand, TIP is negative with respect to RING, diode 259 is forward biased and diode 257 is reverse biased. In this case, diode 257 will be the tuning element for the voltage to frequency converter. Resistors 262, 264, and either resistors 266 or 260 (depending on TIP to RING polarity) form a voltage divider. The voltage divider places approximately one-third of the TIP to RING voltage across the tuning diode (diode 257 or diode 259).

With 0 V bias, the capacitance of diode 257 (or diode 259) is nominally about 500 pF. At 20 V reverse bias, this capacitance drops to about 30 pF.

A mathematical approximation of the tuning diode capacitance, Cd, is given by the equation (1):

$$C_d(V_d) = \exp\left(-.20322 \cdot \frac{V_d}{volt} + 6.294\right) \cdot pF + 29 \cdot pF \tag{1}$$

Either diode 257 or 259 provides the primary capacitance for an RC relaxation oscillator built around the comparator 114. Also contributing to this capacitance are the series coupling capacitors 191 and 192. As described above, capacitors 191 and 192 provide isolation between the modem and the telephone line. These capacitors have as high capacitance as possible to minimize their contribution to the equivalent series capacitance, $C_{eq}$, which is given by equation (2):

$$C_{eq}(V_{\text{tip\_ring}}) = \frac{1}{\left[\frac{1}{C_{191}} + \frac{1}{C_{192}} + \left(\frac{1}{C_d(V_{\text{tip\_ring}})}\right)\right]} \tag{2}$$

As described above, the relaxation oscillator is built around a very low power rail-to-rail output comparator 114. This comparator has a very small size (SOT23-5) and very low power and requires a maximum supply current of about 96 $\mu$A. When the comparator output is high, the equivalent series capacitance is charged toward VCC (+5 V) until the voltage at the inverting input of the comparator 114 exceeds the voltage at the non-inverting input. At that time the comparator output goes low, and the equivalent capacitance discharges through resistor 123. Resistor 112 creates hysteresis in the trip threshold set by resistors 121 and 122. The high and low thresholds are given by equations (3) and (4):

$$V_{\text{th\_high}} = \frac{V_{cc} \cdot R_{122}}{R_{122} + \frac{1}{\left(\frac{1}{R_{121}} - \frac{1}{R_{112}}\right)}} \tag{3}$$

-continued $$V_{th\_low} = \frac{V_{cc} \cdot \frac{1}{\left(\frac{1}{R_{122}} - \frac{1}{R_{112}}\right)}}{\frac{1}{\frac{1}{R_{122}} + \frac{1}{R_{112}}} + R_{121}} \quad (4)$$

Thus, the equivalent series capacitance will alternately charge and discharge exponentially between Vth_high and Vth_low. These thresholds are nominally about 4.2 V and 0.8 volt, respectively.

It can be shown that the theoretical frequency of oscillation is given by equation (5):

$$f(V_{tip\_ring}) = \frac{1}{-2 \cdot \ln\left[\frac{R_{112}}{(R_{112} + R_{122})}\right] \cdot \left(\frac{1}{\frac{1}{R_{123}} + \frac{1}{Z_L \cdot 4}}\right) \cdot C_{eq}(|V_{tip\_ring}|) + 4 \cdot t_{prop}} \quad (5)$$

where $t_{prop}$ is the propagation delay of the comparator 114, and ZL is the impedance of the inductor 120 and the frequency of interest. Inductor 120 is used in parallel with the charge/discharge resistor 123 to shunt common mode 60 Hz current to prevent them from interfering with oscillator operation. The low impedance path for 60 Hz currents provided by inductor 120 allows voltage to frequency converter operation in the presence of up to 500 VAC common mode across the isolation boundary.

As can be seen from equation (5), the frequency of oscillation is inversely proportional to the equivalent series capacitance, Ceq, which in turn, is a function of TIP to RING voltage. The frequency is directly proportional to the magnitude of the voltage.

The modem DAA 103 can be any conventional DAA. A polyswitch PTC 225 is provided to limit short circuit currents in the event of a failed component. The polyswitch PTC 225 is preferably a TR1600-150 manufactured by Raychem. Resistors 220 and 222 limit the DC current through the transformer 202 in the off-hook state. Transformer 202 is preferably an AC transformer having a primary resistance of about 70Ω, as described below. Resistors 220 and 222, each preferably about 150Ω, in combination with the primary resistance of the transformer 202, as well as the resistance of PTC 225, result in a total loop resistance of about 380Ω, plus wiring resistance, and central office source resistance. Even with a worst case central office battery voltage of 42 V, over 20 mA of loop current will flow when the modem is off-hook.

Transformer 202 is preferably an MIT-600 modem coupling transformer manufactured by CP Clare. Transformer 202 has an average primary inductance of about 115 mH, and an average primary resistance of about 70Ω. Secondary inductance is about 102 mH, while secondary resistance is about 70Ω. The nominal turns ratio for transformer 202 is 1:1.

The telephone ring signal is coupled across the modem's isolation boundary by an optocoupler in the telecom switch 204. The telecom switch 204 is preferably a TS117S manufactured by CP Clare and is intended for full-wave rectification of the ring signal. Because the modem IC 101, preferably a Rockwell RC224ATLE, expects a half wave rectified ring signal, diode 240 is placed in parallel with the optocoupler diodes of telecom switch 204. Diode 240 will forward bias at a lower voltage than the optocoupler diode, thereby preventing the optocoupler diode from turning on during alternating half cycles. Capacitor 244 blocks the telephone line DC voltage, while resistor 246 limits the current through the optocoupler diodes during the ring signal.

Diodes 127 and 128 provide protection for the comparator against common mode transients, and a schmitt trigger inverter 111 squares up the oscillator output to ensure that the microcontroller does not count multiple transitions as the oscillator output slowly transitions through the microcontroller input threshold. The inverter 111 is preferably an MC74HC14A manufactured by Motorola.

When a telephone or other telecommunications device is off-hook, the telecom switch 204 provides a current path between TIP and RING, thereby closing the loop for current to flow in the telephone lines, as will be understood by those skilled in the art.

Figure 5:
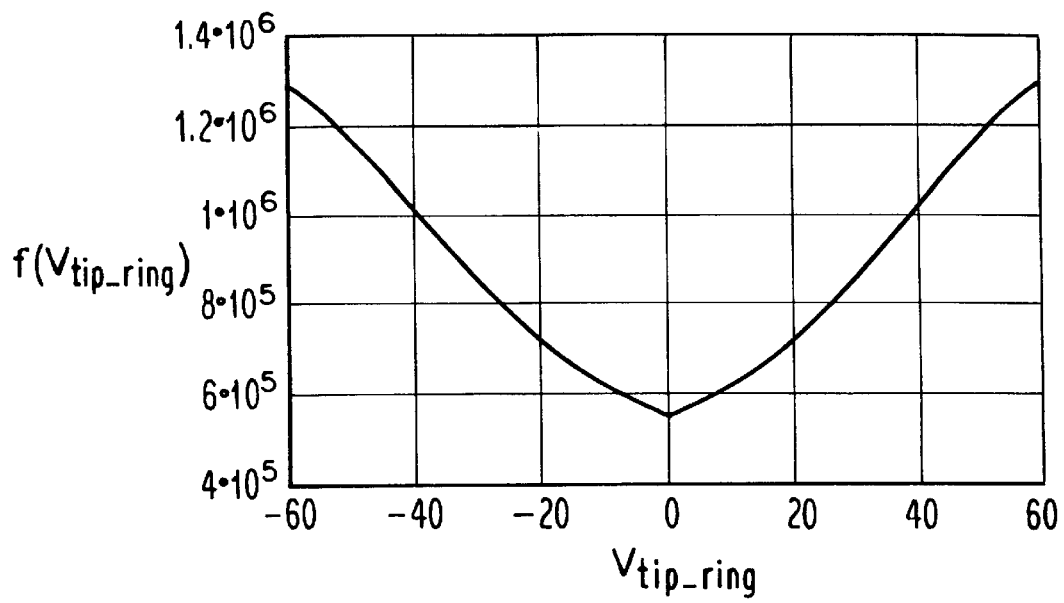
FIG. 5 is a diagram showing the output frequency as a function of the TIP to RING voltage of the off-hook and intrusion detector of FIG. 4.

FIG. 5 shows a graph of output frequency versus TIP to RING voltage. FIG. 5 illustrates that output frequency is dependent on the absolute value of TIP to RING voltage. The output frequency varies from about 570 kHz to 1.3 MHZ as the TIP to RING voltage increases from about 0 V to about 60 V.

Figure 6:
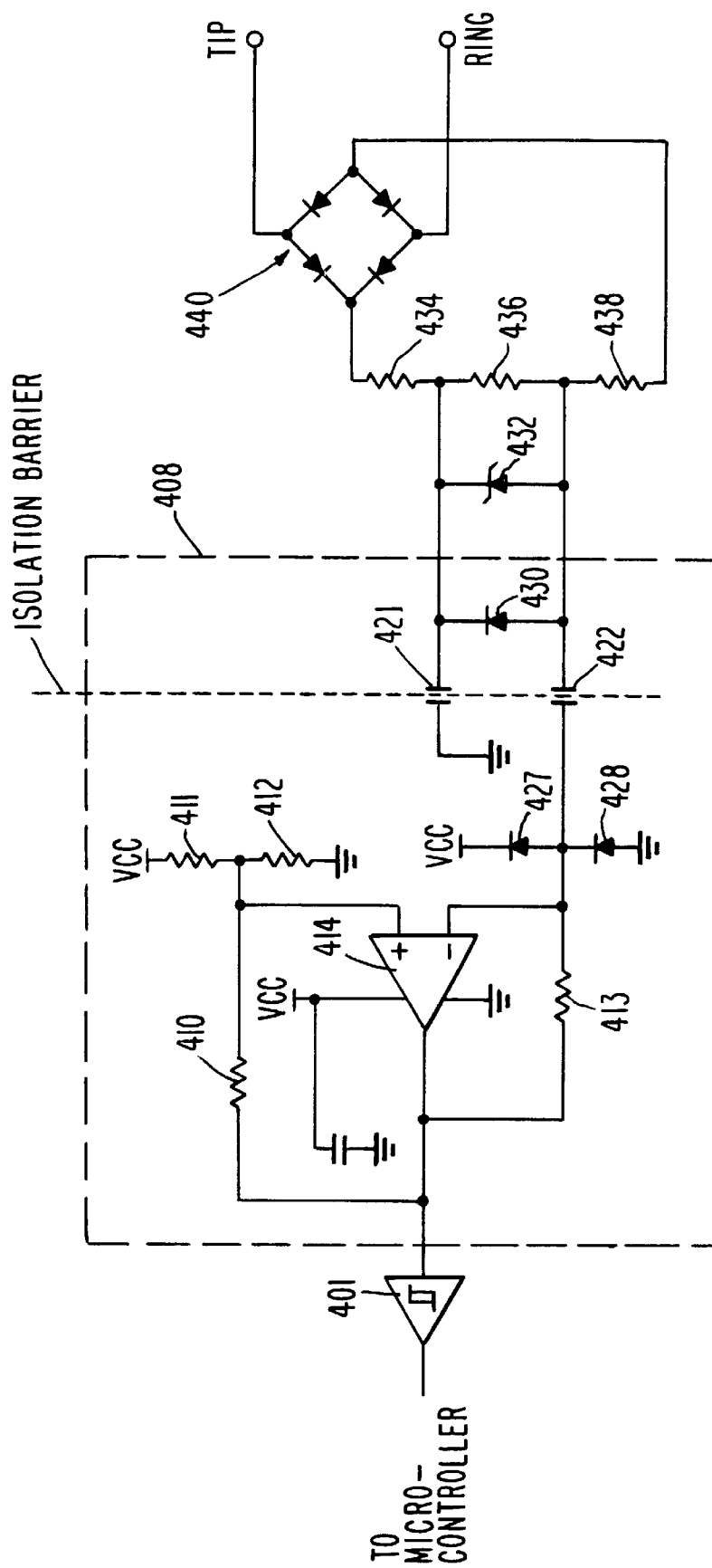
FIG. 6 is a circuit diagram of another exemplary off-hook/intrusion detector in accordance with the present invention.

A second embodiment of a voltage to frequency converter used to detect off-hook and intrusion conditions in accordance with the present invention is shown in FIG. 6. FIG. 6 shows a schematic for the voltage to frequency converter used for off-hook and intrusion detection. As in FIG. 4, not shown are the standard components of a modem, including telephone jack, modem coupling transformer and transient voltage protection components.

In the embodiment of FIG. 6, a high capacitance ratio tuning diode 430 is used in a low frequency (as compared with RC relaxation oscillator 108 as described with respect to FIG. 4) RC relaxation oscillator 408 to form the exemplary voltage to frequency converter. The oscillator 408 comprises elements 410–414, 421, 422, 427, and 428. The voltage to frequency converter uses two coupling capacitors 420, 421 in series with the tuning element to bridge a high voltage isolation barrier. The present invention, therefore, allows a DC voltage to be measured across an isolation barrier without a need to generate an isolated supply voltage at the point of measurement. Thus, additional power is not needed to measure the voltage on a telephone line.

Bridge rectifier 440 allows the modem to be connected with reversed polarity to the telephone line; thus, TIP and RING are interchangeable. The output voltage of the bridge rectifier 440 is the absolute value of the TIP to RING voltage, less diode drops. Bridge rectifier 440 is chosen to have a sufficiently high breakdown voltage to withstand all transients, including the 100+ Vp-p ringing voltage (superimposed on the nominal 48 VDC), not clamped by the standard transient voltage protection (not shown). Bridge rectifier 440 is also chosen with small enough reverse leakage to ensure that the FCC part 68 on-hook impedance regulations (5 MΩ at 200 V) are not violated.

Resistors 434, 436, and 438 form a voltage divider for scaling. These resistors are preferably larger than 5 MΩ to ensure compliance with the FCC on-hook impedance requirements. A maximum central office voltage of 56 V will result in about 19 V across the tuning diode 430. Diode 430, preferably a MVAM125 manufactured by Motorola is a silicon tuning diode with a very high capacitance ratio. With 0 V bias, the capacitance of diode 430 is nominally 500 pF. At 20 V reverse bias, this capacitance drops to about 30 pF.

A clamp diode 432 is used to protect the tuning diode 430 during ringing and other telephone line transient conditions. Diode 432 is preferably a 27 V zener diode.

The preferred tuning diode 430, the MVAM125, is rated to a maximum reverse voltage of 28 V, so one might think that greater tunability could be achieved by adjusting the voltage divider such that the maximum expected TIP to RING voltage (about 56 V) results in about 28 V across diode 430. This is not the case, however, because at high reverse bias voltages, in which the capacitance of diode 430 drops below about 50 pF, a large change in voltage results in small change in capacitance. In addition, the capacitance of the zener diode 432 becomes significant at high reverse bias voltages.

Approximations of the zener capacitance, $C_z$, and tuning diode capacitance, $C_d$, are given by equations (6) and (7):

$$C_Z(V_Z) = \exp\left(-.27926 \cdot \ln\left(\frac{V_Z}{volt}\right) + 3.5\right) \cdot pF \tag{6}$$

$$C_d(V_d) = \exp\left(-.20322 \cdot \frac{V_d}{volt} - 6.294\right) \cdot pF - 29 \cdot pF \tag{7}$$

The tuning diode 430 provides the primary capacitance for an RC relaxation oscillator built around the comparator 414. Also contributing to this capacitance are the parallel zener diode 432 and the series coupling capacitors 421 and 422. Capacitors 421 and 422 are desirable to provide isolation between the modem and the telephone line. Capacitors 421 and 422 are preferably rated for about 6000 VDC. The capacitors 421 and 422 preferably have as high a capacitance as possible to minimize their contribution to the equivalent series capacitance, $C_{eq}$, which is given by equation (8):

$$C_{eq} = \frac{1}{\left[\frac{1}{C_{421}} + \frac{1}{C_{422}} + \left(\frac{1}{C_d + C_Z + C_{parasitic}}\right)\right]} \tag{8}$$

The relaxation oscillator is built around a very low power rail-to-rail output comparator 414, preferably an LMC7211 manufactured by National. This comparator 414 is chosen both for its very small size (SOT23-5) and its very low power; it requires a maximum supply current of only about 18 mA at room temperature. When the comparator output is high, the equivalent series capacitance is charged toward VCC (about +5 V) until the voltage at the inverting input of the comparator exceeds the voltage at the no-inverting input. At that time, the comparator output goes low, and the equivalent capacitance discharges through resistor 413. Resistor 410 creates hysteresis in the trip threshold set by resistors 411 and 412. The high and low thresholds are given by equations (9) and (10):

$$V_{th\_high} = \frac{V_{cc} \cdot R_{412}}{R_{412} + \frac{1}{\left(\frac{1}{R_{410}} - \frac{1}{R_{411}}\right)}} \tag{9}$$

$$V_{th\_low} = \frac{V_{cc} \cdot \frac{1}{\left(\frac{1}{R_{410}} + \frac{1}{R_{412}}\right)}}{\frac{1}{\frac{1}{R_{410}} + \frac{1}{R_{412}}} + R_{411}} \tag{10}$$

Thus, the equivalent series capacitance alternately charges and discharges exponentially between Vth_high and Vth_low. These thresholds are nominally about 4.2 V and 0.8 V.

It can be shown that the theoretical frequency of oscillation is given by equation (11):

$$f = \frac{1}{-2 \cdot \ln\left[\frac{\frac{V_{cc} \cdot R_{412}}{R_{412} + \frac{1}{\left(\frac{1}{R_{411}} + \frac{1}{R_{410}}\right)}} - V_{cc}}{\frac{V_{cc} \cdot \frac{1}{\left(\frac{1}{R_{412}} + \frac{1}{R_{410}}\right)}}{\frac{1}{R_{412}} + \frac{1}{R_{410}}} + R_{411}} - V_{cc}\right] \cdot R_{413} \cdot C_{eq}} \tag{11}$$

As can be seen from equation (11), the frequency of oscillation is inversely proportional to the equivalent series capacitance, $C_{eq}$, which in turn, is a function of TIP to RING voltage.

After accounting for the drop of the bridge rectifier, and the propagation delay of the comparator 414, it can be shown that the output frequency as a function of TIP to RING voltage is given by equation (12):

$$f(V_{tip\_ring}) = \frac{1}{-2 \cdot \ln\left[\frac{R_{410}}{(R_{410} + R_{412})}\right] \cdot R_{413} \cdot C_{eq}(V_{tip\_ring}) + 10 \cdot \mu s} \tag{12}$$

where $$C_{eq}(V_{tip\_ring}) = \frac{1}{\left[\frac{1}{C_1} + \frac{1}{C_2} + \left(\frac{1}{C_d(V_{tip\_ring}) + C_Z(V_{tip\_ring}) + C_{parasitic}}\right)\right]}$$

and $$C_d(V_{tip\_ring}) = \exp\left[\left[-.20322\left[\frac{(V_{tip\_ring} - 0.7 \cdot volt) \cdot R_{436}}{R_{434} + R_{436} + R_{438}} + V_{offset}\right]\right] + 6.2946\right] \cdot pF + 29 \cdot pF$$

$$C_Z(V_{tip\_ring}) = \exp\left[-.27926 \cdot \ln\left[\frac{(V_{tip\_ring} - 0.7 \cdot volt) \cdot R_{436}}{R_{434} + R_{436} + R_{438}} + V_{offset}\right] + 3.837935\right] \cdot pF$$

$C_{parasitic}$ depends on physical geometries, but will likely be about 5 pF. $V_{offset}$ will be about 1 V and accounts for the RMS voltage across the tuning diode 430 due to the oscillator.

Diodes 427 and 428 provide protection for the comparator 414 against common mode transients, while a schmitt trigger inverter 401, squares up the oscillator output to ensure that the modem microcontroller (not shown in FIG. 6) does not count multiple transitions as the oscillator output slowly transitions through the microcontroller input threshold.

When a telephone or other telecommunications device is off-hook, the device provides a current path between TIP and RING, thereby closing the loop for current to flow in the telephone lines, as would be understood by those skilled in the art.

Figure 7:
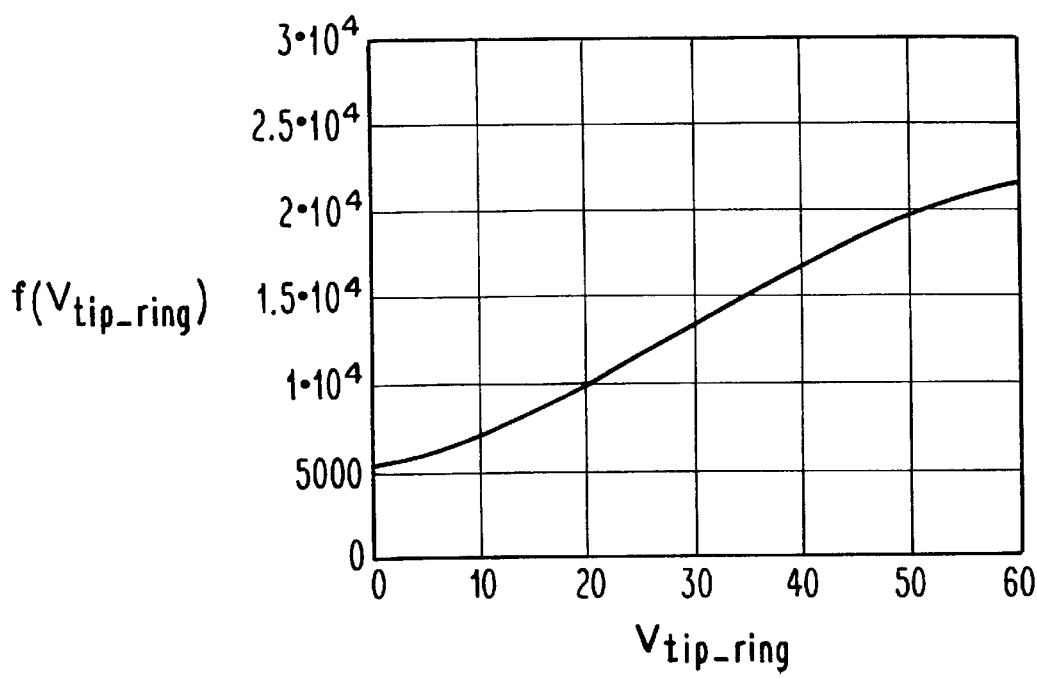
FIG. 7 is a diagram showing the output frequency as a function of the TIP to RING voltage of the off-hook and intrusion detector of FIG. 6.

FIG. 7 shows a graph of output frequency versus TIP to RING voltage. As FIG. 7 illustrates, the output frequency will vary from about 5 kHz to 22 kHz as the TIP to RING voltage increases from 0 V to about 60 V. A linear approximation of the curve in FIG. 7 is given by equation (13):

$$f_{approx}(V_{tip\_ring}) = 5000 \text{ Hz} + V_{tip\_ring} \times 280 \times \text{Hz/Volt} \tag{13}$$

The state of telephone lines in parallel with a modem is determined by monitoring the voltage of the telephone line. Each off-hook phone line closes a current loop associated with the phone line, thus, the voltage drops with each phone line that is off-hook. The present invention converts the telephone voltage into a frequency across an isolation barrier (i.e., the voltage to frequency converter or VCO frequency). The microcontroller measures frequency to determine telephone line voltage. When there are no telephone lines off-hook, the voltage detected at the modem phone lines is close to the voltage of the central office. The first line taken off-hook causes a significant drop in the voltage detected at the modem phone lines. All subsequent lines that are taken off-hook cause much smaller drops in voltage.

Figure 8A:
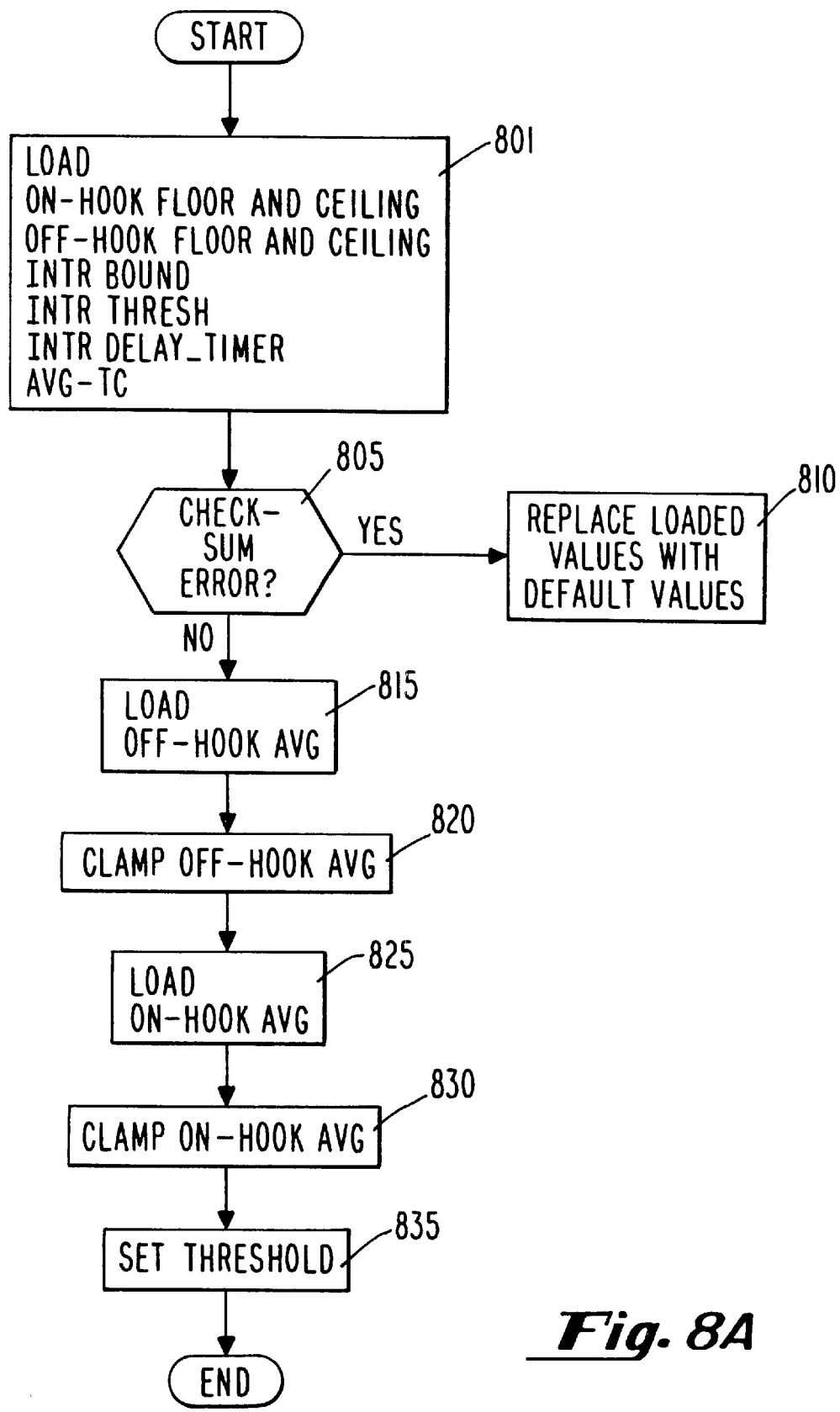
FIGS. 8A–8C are flowcharts showing an exemplary process of detecting off-hook and intrusion conditions in accordance with the present invention.
Figure 8B:
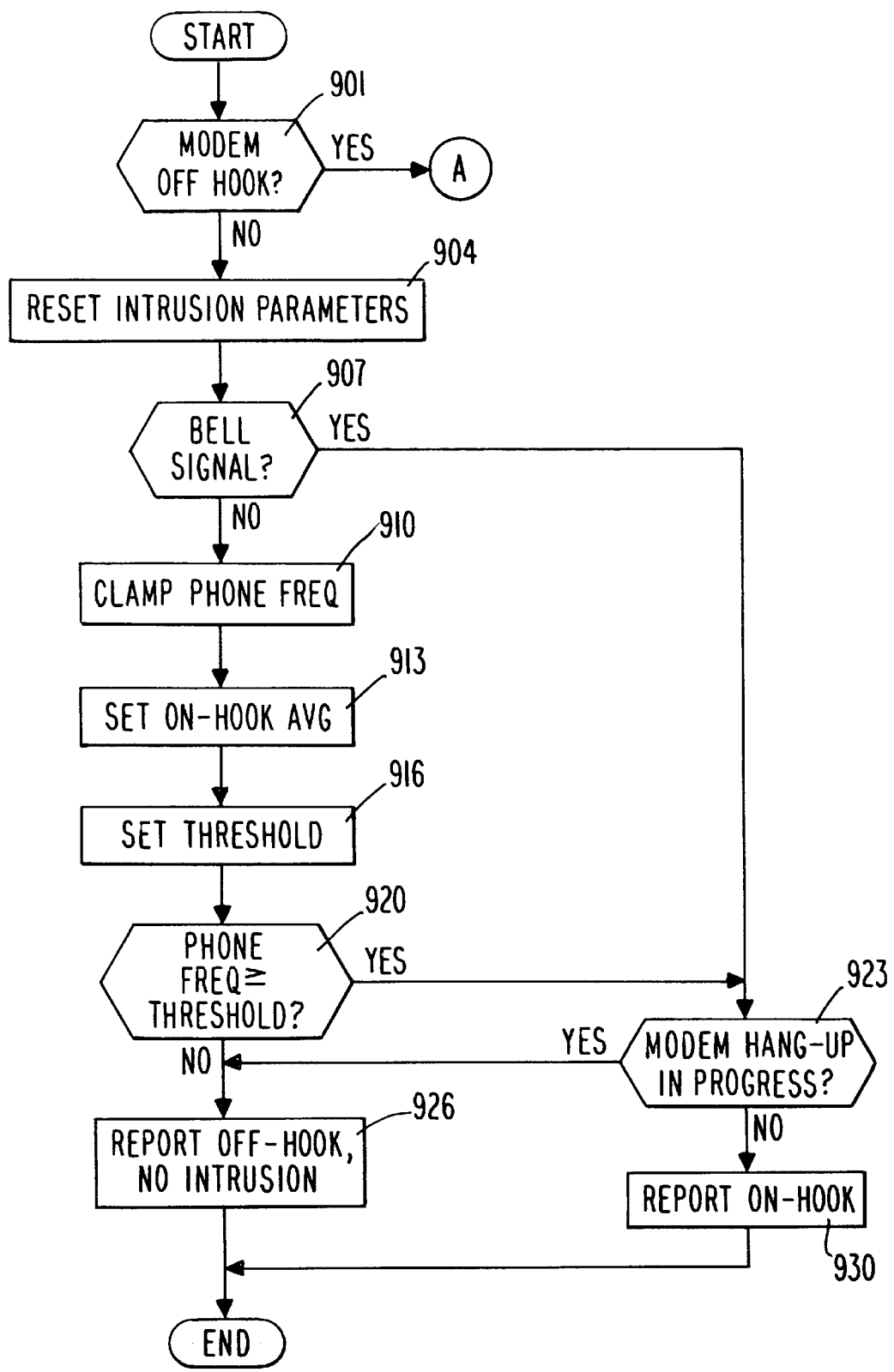
Figure 8C:
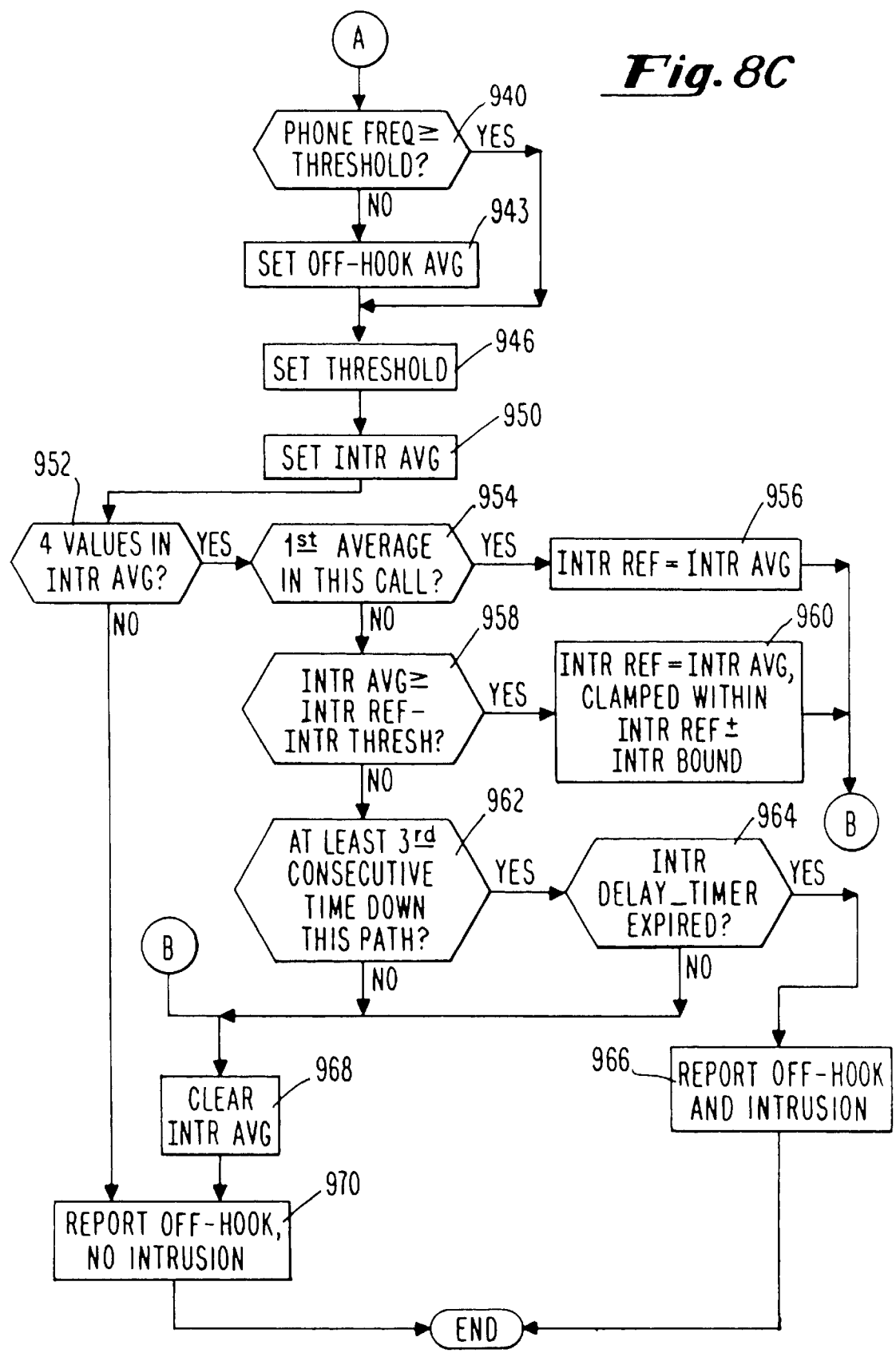

FIGS. 8A–8C are flowcharts of an exemplary method of detecting telephone line status in accordance with an exemplary off-hook and intrusion detector of the present invention. FIG. 8A shows a flowchart for an exemplary initialization process to determine the initial threshold in accordance with the present invention. On powerup of the modem or the detector, at step 801, several variables are retrieved from a storage area, preferably a memory, and more preferably an EEPROM. These variables include the on-hook floor and ceiling, ON-HOOK FLOOR and ON-HOOK CEILING, the off-hook floor and ceiling, OFF-HOOK FLOOR and OFF-HOOK CEILING, the intrusion bounds, INTR BOUND, the intrusion threshold, INTR THRESH, the intrusion delay for a timer, INTR DELAY_TIMER, and the average time constant, AVG-TC. These values are preferably refreshed or updated periodically, preferably once every 60 seconds.

The on-hook floor, ON-HOOK FLOOR, represents the lowest value of the voltage to frequency converter or the VCO frequency that would be expected if all phone devices in the local phone loop were in the on-hook state. The value of ON-HOOK FLOOR is set to be the frequency that the VCO produces when subjected to a telephone line voltage of about 24 VDC (this voltage is user programmable). The on-hook ceiling, ON-HOOK CEILING, represents the highest value of the VCO frequency that would be expected if all phone devices in the local phone loop were in the on-hook state. OFF-HOOK FLOOR and OFF-HOOK CEILING represent the lowest and highest values, respectively, of the VCO frequency that would be expected if at least one phone device in the local phone loop were in the off-hook state.

After loading the variables, the checksum is checked for an error at step 805, and if there is a checksum error, default values are loaded into the variables at step 810.

After the first set of variables have been loaded and checked, the off-hook average, OFF-HOOK AVG, is loaded at step 815, and is clamped between OFF-HOOK FLOOR and OFF-HOOK CEILING at step 820. In other words, OFF-HOOK AVG is checked to determine if it is in the range between OFF-HOOK FLOOR and OFF-HOOK CEILING. If OFF-HOOK AVG is in the range, it retains its value. If it is outside of the range, it is set equal to either OFF-HOOK FLOOR or OFF-HOOK CEILING depending on whether it exceeds the lower range boundary (the floor) or the upper range boundary (the ceiling). OFF-HOOK AVG is the assumed off-hook frequency during a sample period. A sample period is preferably a fraction of a second, and more preferably between $1/64$ and $1/2$ second, and most preferably $1/16$ second.

At step 825, the on-hook average ON-HOOK AVG is loaded, and at step 830, it is clamped between ON-HOOK FLOOR and ON-HOOK CEILING. ON-HOOK AVG is the assumed on-hook frequency during a sample period. This frequency corresponds to the frequency during a sample period and corresponds to the frequency that the VCO produces when subjected to a telephone line voltage of about 48 VDC.

The OFF-HOOK AVG and ON-HOOK AVG values loaded in steps 815 and 825 are preferably the values that existed within a predetermined time period (e.g., one hour) of the most recent power failure. These are the "starter" values when power is restored.

Similar to the variables loaded in step 801, initial values for OFF-HOOK AVG and ON-HOOK AVG are stored in a memory, preferably a non-volatile memory, and preferably within the predetermined time period of the most recent power failure, but can be stored in any type of memory and at any time during an initialization process.

At step 835, the threshold is determined according to equation (14) and the procedure ends. The initial threshold, which is the value of the frequency during a sample period that would indicate that a phone device in the local loop is off-hook, is set to be that as shown by equation (14):

$$\text{THRESHOLD}=(\text{ON-HOOK AVG}+\text{OFF-HOOK AVG})/2 \qquad (14)$$

After completion of the telephone line initialization, the microcontroller begins the continuous monitoring of the telephone line local loop and checks for variations on the voltage threshold limits. During monitoring, the device periodically samples the VCO frequency, as described above. The device uses the sampled frequency to modify the values of the on-hook and off-hook values (ON-HOOK AVG and OFF-HOOK AVG) over time. The device processes this data in one of two ways, depending upon the state (off-hook or on-hook) of the telecommunications unit (e.g., the meter modem) under device control.

FIGS. 8B and 8C are flowcharts detailing an exemplary method of detecting off-hook and intrusion conditions in accordance with the present invention. At step 901, the system determines if the modem is off-hook. If the modem is off-hook, then processing continues with the determination of whether an intrusion has occurred which is described below starting with step 940. If it is determined at step 901 that the modem is on-hook, then intrusion parameters INTR DELAY_TIMER, intrusion average, INTR AVG, and intrusion reference, INTR REF, are reset or refreshed to their initial values at step 904 in accordance with FIG. 8A. INTR DELAY_TIMER and INTR REF are loaded from a memory, preferably an EEPROM. INTR AVG is initialized to zero. At step 907, it is determined whether there is a bell signal; i.e., whether the telephone is ringing. If there is a bell signal, the modem is checked at step 923 to determine if a modem hang-up is in progress. If not, an on-hook condition is reported at step 930. If a modem hang-up is in progress, an off-hook condition with no intrusion is reported at step 926.

If there is no bell signal at step 907, the phone frequency, PHONE FREQ, is clamped between the on-hook floor and the on-hook ceiling, ON-HOOK FLOOR and ON-HOOK CEILING, respectively, at step 910. The on-hook average and threshold are then determined according to equation (15), at steps 913 and 916, respectively. In other words, if the state of the telecommunications unit within the device under microcontroller control is on-hook (i.e., the meter modem is not being used), the on-hook value is updated according to equation (15):

if

ON-HOOK AVG<ON-HOOK FLOOR then ON-HOOK AVG= ON-HOOK FLOOR $$\text{ON-HOOK AVG} = (\text{ON-HOOK AVG} * (2^{AVG\text{-}TC}-1)/2^{AVG\text{-}TC}) + \text{PHONE FREQ}/2^{AVG\text{-}TC} \quad (15)$$

THRESHOLD=(ON-HOOK AVG+OFF-HOOK AVG)/2

In addition to updating the threshold, on-hook, and off-hook values, the controller determines if another telecommunications device in the local loop is off-hook by comparing the most recent phone frequency sample taken to the threshold value. If the value of the phone frequency sample is less than the threshold, then one or more telecommunications devices in the local phone loop is determined to be off-hook. If the value of the phone frequency sample is greater than the threshold, then all telecommunications devices in the local loop are determined to be in the on-hook state. At step 920, the phone frequency is compared with the threshold. If the phone frequency is greater than or equal to the threshold, the modem is checked at step 923 to determine if a modem hang-up is in progress. If there is not a modem hang-up in progress, an on-hook condition is reported at step 930. If a modem hang-up is in progress, or the phone frequency is less than the threshold, an off-hook condition with no intrusion is reported at step 926.

Intrusion detection is performed when the telecommunications device under microcontroller control is off-hook. The object of the intrusion detection is to detect a drop in frequency of the voltage from the TIP and RING terminals occurring within an intrusion sample period and remaining for a number of sample periods, preferably at least three intrusion sample periods. This occurrence would indicate that another telecommunications device in the local loop has transitioned from the on-hook to the off-hook state (e.g., the customer has picked up the telephone to place a call). The first few samples (e.g., three samples, although this can be any number, either predetermined or variable in real-time) taken after the telecommunications device under control transitions to the off-hook state are disregarded to avoid acting on transients associated with that event. Intrusion detection is performed by comparing the current sample to the last sample. If the current sample minus the last sample is greater than a predetermined threshold, then a counter is incremented. If the current sample minus the last sample is not greater than the predetermined threshold, than the last sample is set equal to the current sample and the counter is set to 0. When the counter reaches a predetermined value, such as three, it is determined that intrusion has occurred.

If the modem is determined at step 901 to be off-hook, then processing continues at step 940 with the phone frequency, PHONE FREQ, being compared to the threshold, THRESHOLD. If the phone frequency is less than the threshold, the off-hook average, OFF-HOOK AVG, is set in accordance with equation (16), at step 943. If the phone frequency is greater than or equal to the threshold, or after the off-hook average is set at step 943, the threshold, THRESHOLD, is set in accordance with equation (17), at step 946. If the state of the telecommunications unit within the device under microcontroller control is off-hook (i.e., the meter modem is in use), the off-hook value is updated according to equation (16):

$$\text{OFF-HOOK AVG} = (\text{OFF-HOOK AVG} * (2^{AVG\text{-}TC}-1)/2^{AVG\text{-}TC}) + \text{PHONE FREQ}/2^{AVG\text{-}TC} \quad (16)$$

$$\text{THRESHOLD} = (\text{ON-HOOK AVG} + \text{OFF-HOOK AVG})/2 \quad (17)$$

The intrusion average is then set at step 950 in accordance with equation (18). A sample is taken periodically, preferably every $\frac{1}{16}$ of a second, and after a number of samples (in this example, four) are taken, an average is taken of the samples, in accordance with equation (18).

$$\text{INTR AVG} = \text{INTR AVG} + (\text{PHONE FREQ}/4) \quad (18)$$

At step 952 it is determined if there are four values in the intrusion average (at least four samples are taken in this example before an intrusion can be detected, but any number of samples can be used in accordance with present invention). If four samples have not yet been collected, then not enough data has been collected to conclude that an intrusion has taken place, and an off-hook is reported with no intrusion at step 970, and the procedure exits.

If there are four values in the intrusion average, then processing continues to determine if an intrusion has taken place. It is determined at step 954 if this is the first average in the call. If so, the intrusion reference is set equal to the intrusion average at step 956, the intrusion average is cleared at step 968, and an off-hook is reported with no intrusion at step 970, and the procedure exits. The intrusion reference is needed as a number with which to compare future averages to determine if the voltage across the TIP and RING terminals has decreased, thus indicating an intrusion. If this is not the first average in the call, the intrusion average is compared with the difference (INTR REF–INTR THRESH) at step 958.

If the intrusion average is greater than the difference, the INTR REF is set equal to INTR AVG, and clamped within the limits established by INTR REF±INTR BOUND, at step 960, the intrusion average is cleared (reset to 0) at step 968, and an off-hook is reported with no intrusion at step 970, and the procedure exits. The clamping is used to limit the rate at which INTR REF can change. The intrusion reference is not to change by more than INTR BOUND. Essentially, this limits the rate of change of INTR REF. Otherwise, a change that shows an intrusion may be missed.

If the intrusion average is not greater than or equal to the difference, then further processing is performed to determine if an intrusion has occurred. It is determined at step 962 if this is at least the third consecutive time that the intrusion average is less than the difference. This is performed by checking a counter. If not, the intrusion average is cleared at step 968, and an off-hook is reported with no intrusion at step 970, and the procedure exits. If this is at least the third consecutive time that the intrusion average is less than the difference, however, at optional step 964 it is determined if the intrusion delay timer has expired. If not, the intrusion average is cleared at step 968, and an off-hook is reported with no intrusion at step 970, and the procedure exits. If the intrusion delay timer has expired, an off-hook condition and intrusion is reported at step 966 and the procedure exits.

It should be noted that the intrusion delay timer is started when the procedure starts. The intrusion delay timer, which is optional, is used to prevent an intrusion from being detected in the first X seconds of the monitoring, where X is a user programmable, predetermined number. The timer feature is used to allow certain equipment to stabilize; otherwise, the startup procedures of the equipment may be interpreted to be an intrusion.

Although the exemplary method describes that a drop in frequency between the TIP and RING terminals occurring within an intrusion sample period and remaining for at least three intrusion sample periods results in a finding of intrusion, any number of sample periods can be used as the minimum number of sample periods in which a drop in frequency must occur in order for a finding of intrusion.

The present invention also has a power outage reporting call feature. This feature is enabled by the power supply from a battery to the modem IC. An optional battery pack is used, and can be placed in the meter or external to it. In addition to continuously monitoring the state of the telephone lines by monitoring the voltage frequency across the telephone lines, the present invention monitors the power supply for a power outage.

Although the invention is described above for use in a modem to measure the TIP to RING voltage on a telephone line to determine off-hook status and intrusions, it is not limited thereto. For example, it is contemplated that the circuit of the present invention can be used any time there is a need to measure DC voltage across an isolation barrier.

Thus, the invention provides a low cost, very low power means for a microcontroller in a modem to determine the state of parallel connected telecommunications devices on a shared telephone line. The invention further enables this detection across a high voltage isolation barrier without needing to generate isolated power across the isolation barrier. Additional power is not needed to measure the voltage on a telephone line. The invention determines the state of parallel connected devices by monitoring the voltage between the TIP and RING terminals of the telephone line.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. An apparatus for determining the state of a telephone line, comprising:
    voltage to frequency measurement means for measuring a voltage between a TIP terminal and a RING terminal on said telephone line and converting said voltage to a frequency; and
    comparator means for comparing said frequency with a first value to determine the state of said telephone line.

2. The apparatus of claim 1, where in said voltage to frequency measurement means comprises a voltage to frequency converter and said comparator means comprises a microcontroller, said microcontroller coupled to said voltage to frequency converter to receive said frequency from said voltage to frequency converter.

3. The apparatus of claim 2, wherein said voltage to frequency converter comprises a RC relaxation oscillator having a tuning element and an active element.

4. The apparatus of claim 3, wherein said tuning element is a diode and said active element is a comparator.

5. The apparatus of claim 3, further comprising:
    a TIP/RING filter coupled between said TIP and RING terminals and said voltage to frequency measurement means; and
    a voltage isolator coupled between said tuning element and said active element.

6. The apparatus of claim 5, wherein said voltage isolator comprises two coupling capacitors connected in series with said tuning element.

7. The apparatus of claim 1, further comprising means for connecting a modem to said telephone line when said frequency is not less than said first value.

8. The apparatus of claim 7, further comprising means for disconnecting said modem from said telephone line when a value responsive to said frequency becomes less than a second value.

9. The apparatus of claim 1, further comprising means for preventing a telecommunications device from connecting on said telephone line when said frequency is less than said first value.

10. The apparatus of claim 1, wherein said first value is determined responsive to said voltage between said TIP terminal and said RING terminal.

11. An apparatus for determining an intrusion state of a telephone line having a telecommunications device connected thereon, comprising:
    voltage to frequency measurement means for measuring a voltage between a TIP terminal and a RING terminal on said telephone line and converting said voltage to a frequency; and
    comparator means for comparing said frequency with a threshold value to determine the intrusion state of said telephone line.

12. The apparatus of claim 11, further comprising means for disconnecting said telecommunications device from said telephone line when said value responsive to said frequency is less than said threshold value.

13. An apparatus for determining the state of a telephone line, comprising:
    measurement means comprising a tuning diode for measuring a voltage between a TIP terminal and a RING terminal on said telephone line; and
    comparator means for comparing a value responsive to said voltage with a first value to determine the state of said telephone line.

14. The apparatus of claim 13, wherein said value is a frequency, said measurement means further comprises a voltage to frequency converter and said comparator means comprises a microcontroller, said microcontroller coupled to said voltage to frequency converter to receive an output frequency from said voltage to frequency converter.

15. The apparatus of claim 14, wherein said voltage to frequency converter comprises a RC relaxation oscillator having said tuning diode and an active element.

16. The apparatus of claim 15, wherein and said active element is a comparator.

17. The apparatus of claim 15, further comprising:
    a TIP/RING filter coupled between said TIP and RING terminals and said measurement means; and
    a voltage isolator coupled between said tuning diode and said active element.

18. The apparatus of claim 17, wherein said voltage isolator comprises two coupling capacitors connected in series with said tuning diode.

19. The apparatus of claim 13, further comprising means for connecting a modem to said telephone line when said value is not less than said first value.

20. The apparatus of claim 19, further comprising means for disconnecting said modem from said telephone line when said value becomes less than a second value.

21. The apparatus of claim 13, further comprising means for preventing a telecommunications device from connecting on said telephone line when said value is less than said first value.

22. The apparatus of claim 13, wherein said first value is determined responsive to said voltage between said TIP terminal and said RING terminal.

23. An apparatus for determining the state of a telephone line, comprising:

measurement means comprising capacitive isolation for measuring a voltage between a TIP terminal and a RING terminal on said telephone line; and comparator means for comparing a value responsive to said voltage with a first value to determine the state of said telephone line.

24. The apparatus of claim 23, wherein said value is a frequency, said measurement means comprises a voltage to frequency converter and said comparator means comprises a microcontroller, said microcontroller coupled to said voltage to frequency converter to receive an output frequency from said voltage to frequency converter.

25. The apparatus of claim 24, wherein said voltage to frequency converter comprises a RC relaxation oscillator having a tuning element and an active element.

26. The apparatus of claim 25, wherein said tuning element is a diode and said active element is a comparator.

27. The apparatus of claim 25, further comprising:
a TIP/RING filter coupled between said TIP and RING terminals and said measurement means,
wherein said capacitive isolation comprises a voltage isolator coupled between said tuning element and said active element, said voltage isolator having two coupling capacitors connected in series with said tuning element.

28. The apparatus of claim 23, further comprising means for connecting a modem to said telephone line when said value is not less than said first value.

29. The apparatus of claim 28, further comprising means for disconnecting said modem from said telephone line when said value becomes less than a second value.

30. The apparatus of claim 23, further comprising means for preventing a telecommunications device from connecting on said telephone line when said value is less than said first value.

31. The apparatus of claim 23, wherein said first value is determined responsive to said voltage between said TIP terminal and said RING terminal.

32. An apparatus for detecting an off-hook condition and an intrusion condition on a telephone line, comprising:
a voltage to frequency converter for measuring a voltage on said telephone line and converting said voltage to a frequency, the voltage to frequency converter comprises a RC relaxation oscillator having a tuning diode and a comparator; and
a microcontroller coupled to said voltage to frequency converter for receiving said frequency and determining whether at least one of an off-hook and intrusion condition exists on said telephone line responsive to said frequency.

33. The apparatus of claim 32, wherein said voltage is a TIP to RING voltage.

34. The apparatus of claim 32, further comprising a common mode filter coupled between said telephone line and said voltage to frequency converter, and a voltage isolator coupled between said tuning diode and said comparator.

35. The apparatus of claim 32, further comprising means to connect a modem to said telephone line when no off-hook condition is detected.

36. The apparatus of claim 35, further comprising means to disconnect said modem from said telephone line when an intrusion condition is detected.

37. The apparatus of claim 32, wherein said voltage to frequency converter measures said voltage at a predetermined sampling rate.

38. The apparatus of claim 37, wherein said predetermined sampling rate is one measurement every $1/16$ seconds.

39. The apparatus of claim 32, wherein said off-hook condition is detected when said frequency drops below a first threshold and said intrusion condition is detected when a value responsive to said frequency drops below a second threshold.

40. The apparatus of claim 32, further comprising memory to store frequency and voltage data used by said microcontroller in the detection of said off-hook and said intrusion conditions.

41. An apparatus for determining the state of a telephone line having a TIP terminal and a RING terminal, comprising:
a measuring device that measures a voltage between the TIP terminal and the RING terminal on said telephone line;
a comparator that compares a value responsive to said voltage with a first value to determine the state of said telephone line; and
a capacitor coupled between the measuring device and the capacitor, the capacitor providing electrical isolation, whereby the TIP and RING terminals may be free of a power supply.

42. The apparatus of claim 41, wherein said value is a frequency, said measuring device comprises a voltage to frequency converter and said comparator comprises a microcontroller, said microcontroller coupled to said voltage to frequency converter to receive an output frequency from said voltage to frequency converter.

43. The apparatus of claim 42, wherein said voltage to frequency converter comprises a RC relaxation oscillator having a tuning element and an active element and the voltage to frequency converter comprises the capacitor.

44. The apparatus of claim 43, wherein said tuning element is a diode and said active element is a comparator.

45. The apparatus of claim 43, further comprising:
a TIP/RING filter coupled between said TIP and RING terminals and said measuring device; and
a voltage isolator coupled between said tuning element and said active element.

46. The apparatus of claim 45, wherein said voltage isolator comprises two coupling capacitors connected in series with said tuning element.

47. The apparatus of claim 41, further comprising means for connecting a modem to said telephone line when said value is not less than said first value.

48. The apparatus of claim 47, further comprising means for disconnecting said modem from said telephone line when said value becomes less than a second value.

49. The apparatus of claim 41, further comprising means for preventing a telecommunications device from connecting on said telephone line when said value is less than said first value.

50. The apparatus of claim 41, wherein said first value is determined responsive to said voltage between said TIP terminal and said RING terminal.

51. An apparatus for determining the state of a signal-carrying line having an isolation barrier separating the signal-carrying line into a side near a first and second terminal, and a side away from the first and second terminals, comprising:
measurement means for measuring a voltage between the first and second terminals, said measurement means being free of a power supply on said side near the first and second terminals, the measurement means comprising a voltage to frequency converter that converts the measured voltage to a frequency; and comparator means for comparing the frequency with a first value to determine the state of said signal-carrying line.

52. The apparatus of claim 51, wherein said comparator means comprises a microcontroller, said microcontroller coupled to said voltage to frequency converter to receive the frequency from said voltage to frequency converter.

53. The apparatus of claim 52, wherein said voltage to frequency converter comprises a RC relaxation oscillator having a tuning element and an active element, said tuning element is a diode and said active element is a comparator.

54. The apparatus of claim 53, further comprising:
  a filter coupled between said first and second terminals and said measurement means; and
  a voltage isolator coupled between said tuning element and said active element.

55. The apparatus of claim 54, wherein said voltage isolator comprises two coupling capacitors connected in series with said tuning element.

56. The apparatus of claim 51, further comprising means for connecting a device to said signal-carrying line when said frequency is not less than said first value.

57. The apparatus of claim 56, further comprising means for disconnecting said device from said signal-carrying line when said frequency becomes less than a second value.

58. The apparatus of claim 51, further comprising means for preventing a device from connecting on said signal-carrying line when said frequency is less than said first value.

59. The apparatus of claim 51, wherein said first value is determined responsive to said voltage between said first and second terminals.

60. A method for detecting the state of a telephone line, comprising the steps of:
  measuring a voltage between a TIP terminal and a RING terminal on said telephone line;
  converting said voltage to a frequency using a voltage to frequency converter;
  comparing said frequency with a threshold value to determine the state of said telephone line.

61. The method of claim 60, further comprising the steps of:
  connecting a modem to said telephone line when said frequency is not less than said threshold value; and
  disconnecting said modem from said telephone line when a value responsive to said frequency becomes less than a second value.

62. The method of claim 60, wherein said voltage is measured at a predetermined sampling rate.

63. The method of claim 62, wherein said predetermined sampling rate is one measurement every $1/16$ seconds.

64. The method of claim 60, further comprising the step of setting said first value responsive to said voltage between said TIP terminal and said RING terminal.

65. A method for detecting the state of a telephone line, comprising the steps of:
  measuring a voltage between a TIP terminal and a RING terminal on said telephone line;
  comparing a value responsive to said voltage with one of a first threshold value and a second threshold value to determine the state of said telephone line;
  connecting a telecommunications device to said telephone line when said value is not less than said first threshold value;
  disconnecting said telecommunications device from said telephone line when said value becomes less than said second threshold value; and
  adjusting said first threshold value and said second threshold value based on the state of said telephone line and said voltage between said TIP terminal and said RING terminal.

66. A method for determining an intrusion state of a telephone line having a telecommunications device connected thereon, comprising the steps of:
  measuring a voltage between a TIP terminal and a RING terminal on said telephone line and converting said voltage to a frequency; and
  comparing said frequency with a threshold value to determine the intrusion state of said telephone line.

67. The method of claim 66, further comprising the step of disconnecting said telecommunications device from said telephone line when said frequency is less than said threshold value.

* * * * *